US012650179B2

(12) United States Patent
Nguyen

(10) Patent No.: US 12,650,179 B2
(45) Date of Patent: Jun. 9, 2026

(54) ELECTROMAGNETICALLY ACTUATED PRESSURE RELIEF VALVE FOR FRACTURING SYSTEMS

(71) Applicant: Cantex International, Inc., Houston, TX (US)

(72) Inventor: Duy D. Nguyen, Cypress, TX (US)

( * ) Notice: Subject to any disclaimer, the term of this patent is extended or adjusted under 35 U.S.C. 154(b) by 60 days.

(21) Appl. No.: 18/444,010

(22) Filed: Feb. 16, 2024

(65) Prior Publication Data

US 2025/0264165 A1     Aug. 21, 2025

(51) Int. Cl.
 *F16K 31/06*         (2006.01)
 *E21B 21/10*         (2006.01)
 (Continued)

(52) U.S. Cl.
 CPC .......... *F16K 37/005* (2013.01); *E21B 21/106* (2013.01); *F16K 17/044* (2013.01); *F16K 17/048* (2013.01); *F16K 17/0493* (2013.01); *F16K 31/0675* (2013.01); *F16K 31/10* (2013.01); *Y10T 137/7761* (2015.04); *Y10T 137/7905* (2015.04); *Y10T 137/7923* (2015.04); *Y10T 137/7932* (2015.04); *Y10T 137/7933* (2015.04); *Y10T 137/7934* (2015.04); *Y10T 137/7935* (2015.04)

(58) Field of Classification Search
 USPC ......... 137/529, 533.19, 533.21, 533.31, 540; 166/53, 308.1; 251/65, 129.04, 129.16
 See application file for complete search history.

(56) References Cited

U.S. PATENT DOCUMENTS 2,619,115 A * 11/1952 Dondero ................. F16K 17/04
                                                          137/543
3,040,772 A * 6/1962 Todd ....................... F16K 17/10
                                                          175/218
(Continued)

FOREIGN PATENT DOCUMENTS

EP          0357964 A2     3/1990
EP          0357965 A2     3/1990

OTHER PUBLICATIONS

*3" 1502 N2 Relief Valve Operation and Maintenance Manual*, Tech-Seal International (Rev. Nov. 3, 16, 2018).
(Continued)

*Primary Examiner* — Matthew W Jellett
(74) *Attorney, Agent, or Firm* — Keith B. Willhelm

(57) ABSTRACT

Valves for relieving pressure from high-pressure fluid systems have a valve fitting and a valve actuator. The pressure relief valve is normally shut and is adapted to open at a relief fluid pressure. It comprises a valve fitting and an actuator. The actuator has a valve stem, a spring, and an electromagnet. The stem is coupled to a valve body and mounted for linear reciprocation. The spring applies a mechanical force that biases the stem to place the valve in a normally shut state, but allows the valve to open at a first fluid pressure below the relief pressure. The electromagnet applies a magnetic force that, together with the mechanical force, holds the valve in an operationally shut state at a second fluid pressure above the relief pressure. The valve may be opened at fluid pressures above the first fluid pressure by de-energizing the electromagnet at the relief pressure.

41 Claims, 8 Drawing Sheets

(51) Int. Cl.
    *F16K 17/04*     (2006.01)
    *F16K 31/10*     (2006.01)
    *F16K 37/00*     (2006.01)

(56) References Cited

U.S. PATENT DOCUMENTS

| | | | | |
|---|---|---|---|---|
| 3,270,763 | A * | 9/1966 | Kiefer | G05D 16/10 |
| | | | | 137/115.18 |
| 3,308,846 | A | 3/1967 | Yuile | |
| 3,409,037 | A * | 11/1968 | Nelson | F16K 17/10 |
| | | | | 92/143 |
| 3,433,256 | A * | 3/1969 | Tobler | F16K 31/0651 |
| | | | | 251/129.21 |
| 4,335,744 | A * | 6/1982 | Bey | F16K 47/08 |
| | | | | 251/86 |
| 4,691,876 | A * | 9/1987 | Kranz | F42B 10/663 |
| | | | | 244/3.22 |
| 4,796,661 | A | 1/1989 | Hishinuma et al. | |
| 5,487,407 | A | 1/1996 | Eaker | |
| 5,806,553 | A | 9/1998 | Sidwell | |
| 5,975,129 | A * | 11/1999 | Williams | E21B 21/106 |
| | | | | 137/514.7 |
| 6,000,417 | A * | 12/1999 | Jacobs | F16K 31/084 |
| | | | | 137/239 |
| 6,189,563 | B1 | 2/2001 | Taylor | |
| 7,506,663 | B2 * | 3/2009 | Thomas | F16K 15/06 |
| | | | | 137/533.19 |
| 7,516,792 | B2 * | 4/2009 | Lonnes | E21B 47/18 |
| | | | | 166/308.1 |
| 9,074,517 | B2 * | 7/2015 | Matsusaka | F16K 31/0651 |
| 9,109,717 | B2 | 8/2015 | Crawford | |
| 9,249,648 | B2 * | 2/2016 | Lehr | E21B 21/10 |
| 9,273,543 | B2 | 3/2016 | Baca et al. | |
| 9,845,898 | B1 * | 12/2017 | Johnson | F16K 17/02 |
| 9,976,704 | B2 | 5/2018 | Herndon | |
| 10,436,341 | B1 | 10/2019 | Hill et al. | |
| 11,028,932 | B2 | 6/2021 | Fink | |
| 11,125,352 | B1 * | 9/2021 | Reynoso | F16K 27/029 |
| 11,614,175 | B2 | 3/2023 | Jahnke | |
| 2008/0078586 | A1 | 4/2008 | Tettleton et al. | |
| 2012/0205122 | A1 * | 8/2012 | Peter | E21B 34/085 |
| | | | | 166/321 |

OTHER PUBLICATIONS

*Emergency Unloading Pressure Relief Valve Operation and Maintenance Manual*, Tech-Seal International (Rev. C Jul. 2, 2018).
*M1125 Relief Valve Operation and Maintenance Manual*, Tech-Seal International (Rev. C Mar. 3, 2023).
*Parts of a Solenoid Valve*, SafeRack Industrial Index.
*Safety Shutdown Valves Control System*, Cameron (2017).

* cited by examiner

ELECTROMAGNETICALLY ACTUATED PRESSURE RELIEF VALVE FOR FRACTURING SYSTEMS

FIELD OF THE INVENTION

The present invention relates generally to pressure relief valves, and especially to pressure relief valves for fluid transportation systems conveying particulate-laden, corrosive fluids under high pressure and flow rates as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production from the well may not be commercially viable because hydrocarbons flow though the formation and collect in the well at very low rates. The industry, therefore, relies on various techniques for improving the well and stimulating production from formations. In particular, various techniques are available for increasing production from formations which are relatively nonporous, often referred to as "tight" formations.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which allow hydrocarbons to flow out of the formation more easily.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

Given the length of typical wellbores, a formation rarely will be fractured all at once. It typically will be fractured in many different locations or zones and in many different stages. Fluids will be pumped into the well to fracture the formation in a first zone. After the initial zone is fractured, pumping is stopped, and a plug is installed in the liner at a point above the fractured zone. Pumping is resumed, and fluids are pumped into the well to fracture the formation in a second zone located above the plug. That process is repeated for zones further up the wellbore until the formation has been completely fractured.

Once the well is fractured, the large quantities of water and sand that were injected into the formation must be allowed to flow out of the well. The water and sand will be separated from hydrocarbons produced by the well to protect downstream equipment from damage and corrosion. The production stream also may require additional processing to neutralize corrosive agents in the stream.

The pressures and flow rates required to fracture typical oil and gas wells are extremely high: pressures up to 20,000 psi and flow rates up to 100 bbl/minute. Such pressures and rates greatly exceed the capacity of any single frac pump. The cumulative output of many frac pumps, therefore, is required to reach the required pressures and flow rates. High pressure conduits must be assembled to convey fluid from the array of pumps ultimately into a single well.

Systems for successfully completing a fracturing operation, therefore, are extensive and complex, as may be appreciated from FIG. 1. FIG. 1 illustrates schematically a conventional frac system 24. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11. Pumps 10 take the slurry and discharge it at high pressure through individual high-pressure "discharge" lines 12 into a "missile" 13 on frac manifold 9.

Frac systems typically are designed to deliver flow to multiple well heads. Frac system 24, for example, incorporated a zipper manifold 16. The combined flow from missile 13 on frac manifold 9 is fed through a high-pressure line 14 running to a junction head 15 of zipper manifold 16 (sometimes also referred to as a "frac manifold"). Zipper manifold 16 is designed to deliver flow to three well heads 19 via flow lines 17. Valves 18 are provided in zipper flow lines 17 so that the frac slurry may be selectively diverted to one of the well heads 19. Once fracturing is complete, flow back from the fracturing operation discharges into a flowback manifold 20 which leads into flowback tanks 21. Valves 18 then will be operated to divert frac fluid into the other well head 19 to frac that well.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow line 14 running to goat head 15. They operate at the high pressures required for fracturing well 1.

The flow lines and units making up the high-side of a frac system, such as pump discharge lines 12 and flow line 14, typically are assembled from a large number of individual components often referred to as "frac iron," "flow iron," or "ground iron." Frac iron components include straight steel pipe, fittings for splitting, combining, or changing direction of a line, gauges and other monitoring equipment, and valves and other control devices. Frac iron components are fabricated from heavy, high tensile steel and are quite rugged. They may be rated for high-pressure service up to 20,000 psi.

Nevertheless, flowline components can suffer shortened service life or failure due to the harsh conditions to which they are exposed. Not only are fluids pumped through the system at very high pressure and flow rates, but the fluid is abrasive and corrosive. Components may suffer relatively rapid erosion. The high flow rates and pressures also create vibrations through the system and exacerbate and concentrate stress on the components. The resulting strain may create fractures in the components which can propagate and lead to failure, especially in areas weakened by erosion and corrosion.

Frac jobs also have become more extensive, both in terms of the pressures required to fracture a formation and the time required to complete all stages of an operation. Prior to horizontal drilling, a typical vertical well might be fractured in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Any failure of flowline components on site may interrupt fracturing, potentially reducing its effectiveness and inevitably increasing the amount of time required to complete the operation. Moreover, if a component fails, large quantities of fluid can be ejected at very high pressures, causing the components to move violently and potentially injure workers. Flowline components must be certified and periodically inspected and recertified, but not all damage to or weakening of the components may be detected. Fatigue stress and microscopic fracturing is difficult to detect and can lead to catastrophic failure.

Consequently, and especially in respect to the high-side of a system, if operating pressures exceed the pressure rating of a flow line at any point, operators typically will simply scrap any component that was exposed to above-rated pressures. That can add up to significant cost. Having been designed and manufactured for such harsh operating conditions, flow iron components are quite expensive, especially components rated for high pressures. Operators, therefore, invariably incorporate valves for releasing pressure from a line before the rated pressure is exceeded.

One approach is to use an automatically controlled actuator to open and shut a valve. The actuator, either a rotary or linear actuator as appropriate, is coupled to a valve that can be opened and shut, such as a needle, globe, plug, or gate valve. The valve is tapped into the high-pressure line, as is a transducer or other sensor capable of detecting pressure. The pressure sensor is connected to a controller that will open the valve if excess pressure is detected. Once excess pressure has bled off and rated pressures are restored, the controller shuts the valve again.

Pressure transducers are capable of measuring pressures with accuracy and precision. Thus, automatically controlled actuators can reliably open a pressure relief valve when pressures in the line actually exceed a predetermined threshold pressures, but will not open the valve unless the threshold pressure is exceeded. On the other hand, when the threshold pressure is exceeded, and no matter how quickly it is activated, the actuator may be slow to fully open the valve and, therefore, excessive pressure may persist in the system for some time.

Self-actuating valves, essentially check valves, also are used as pressure relief valves. A valve element, such as a needle or globe element, but most commonly a ball, is exposed to pressure in a flow line, but is held against a valve seat by a spring or compressed gas. Such valves, however, are extremely difficult to calibrate. Thus, they frequently will actuate above or below their rated opening pressure. Moreover, self-actuating valves often do not open fully, and the valve element often presents a significant restriction to flow through the valve seat.

Another general approach is to use valves with a sacrificial closure, most commonly a burst valve. Such valves are not opened and closed in the common sense of the words. The sacrificial closure is intended for one use only. A burst disc, for example, may be used to shut off a conduit through the valve. The burst disc is designed to burst when a specified pressure is exceeded, thus opening the conduit and allowing the line to bleed off fluid. Once the disc has burst, a burst valve will remain "open" until a new disc is installed.

Valves with sacrificial closures also can provide accurate and precise release of excessive pressures. The degree of control, however, depends on how reliably and consistently the burst disc or other closure fails. Burst discs in particular may be manufactured to precise specifications with very close tolerances, but are relatively expensive. Lower tolerance burst discs are significantly cheaper. If used, however, they must be rated well below a desired relief pressure to ensure that they fail when required. Necessarily, then, they may frequently burst below rated pressures and cause unnecessary disruption of the fracturing process. Moreover, burst discs have a shelf life beyond which they will not perform to specification, and the smaller the tolerance, the shorter the shelf life.

The statements in this section are intended to provide background information related to the invention disclosed and claimed herein. Such information may or may not constitute prior art. It will be appreciated from the foregoing, however, that there remains a need for new and improved pressure relief valves. More particularly, there is a great need for pressure relief valves that are better suited for use in frac systems and other systems used to convey abrasive and corrosive fluids at high pressures and flow rates. Such disadvantages and others inherent in the prior art are addressed by various aspects and embodiments of the subject invention.

SUMMARY OF THE INVENTION

The subject invention, in its various aspects and embodiments, relates generally to pressure relief valves. The novel pressure relief valves are designed for high-pressure fluid transportation systems, and especially those, such as systems for fracturing a well, that convey abrasive and corrosive fluids at high pressures and flow rates. The invention encompasses various embodiments and aspects, some of which are specifically described and illustrated herein.

One broad embodiment of the invention provides for a pressure relief valve for frac systems and other high-pressure fluid transportation systems. The pressure relief valve is normally shut and is adapted to open at a relief fluid pressure. It comprises a valve fitting and a valve actuator coupled to the valve fitting.

The valve fitting comprises a housing, a valve seat and a valve body. The housing is adapted for assembly into a high-pressure flow line and comprises a fluid inlet, a fluid outlet, and a fluid flow path between the inlet and the outlet. The valve seat is in the flow path. The valve body is adapted to selectively seat on the valve seat and is exposed to fluid pressure in the inlet.

The valve actuator comprises a bonnet, a valve stem, a resilient element, and an electromagnet. The bonnet is coupled to the valve fitting housing. The valve stem is coupled to the valve body. The valve stem is mounted for linear reciprocation between a closed position and an open position. In the closed position, the valve body is seated on the valve seat to shut off flow through the flow path. In the open position, the valve body is unseated from the valve seat to allow flow through the flow path.

The resilient element applies a mechanical force that biases the valve stem in its closed position, thus placing the valve in a normally shut state. The mechanical force, however, allows the valve stem to move to its open position, thus placing the valve in an open state, at a first fluid pressure in the inlet below the relief pressure.

The electromagnet applies, when energized, a magnetic force that biases the valve stem in its closed position. Together with the mechanical force applied by the resilient element, the magnetic force is sufficient to hold the valve stem in its closed position, thus placing the valve in an operationally shut state, at a second fluid pressure in the inlet above the relief pressure. Thus, the is placed in its open state at fluid pressures above the first fluid pressure by de-energizing the electromagnet at the relief pressure.

Other embodiments provide such pressure relief valves where the valve is assembled into the flow line by hammer unions on the fitting housing.

Still other embodiments provide such pressure relief valves where the bonnet is coupled to the fitting housing by a hammer-type union.

Yet other embodiments provide such pressure relief valves where the bonnet is assembled from a first sub and a second sub.

Further embodiments provide such pressure relief valves where the valve actuator comprises a ferromagnetic plate fixedly mounted on the valve stem, the resilient element applies the mechanical force to the plate to bias the valve stem in its closed position; and the electromagnet, when energized, applies the electromagnet force to the plate to bias the valve stem in its extended, closed position.

Additional embodiments provide such pressure relief valves where the ferromagnetic plate is mounted on the valve stem by threaded engagement.

Other embodiments provide such pressure relief valves where the valve stem comprises an annular ferromagnetic plate mounted around the valve stem and extending radially therefrom.

Still other embodiments provide such pressure relief valves where the electromagnet has a generally annular shape and is mounted around the valve stem of the valve actuator.

Yet other embodiments provide such pressure relief valves where the annular electromagnet and the annular plate have substantially equal diameters.

Further embodiments provide such pressure relief valves where the resilient member is a coil spring.

Additional embodiments provide such pressure relief valves where the resilient element is a spring and the valve comprises a first spring retainer, a second spring retainer, and an adjusting nut. The first spring retainer is slidably mounted around the valve stem between the electromagnet and a first end of the spring. The second spring retainer slidably mounted around the valve stem adjacent a second end of the spring. The adjusting nut bears on the second retainer and is adapted to position the second retainer along the valve stem and thereby adjust the biasing force of the spring.

Other embodiments provide such pressure relief valves where the valve seat is a cylindrical seat provided in a bore extending from the inlet or the outlet and the valve body is a plug. The plug is adapted to extend into the cylindrical seat to shut off flow through the flow path and to retract from the cylindrical seat to allow flow through the flow path.

Still other embodiments provide such pressure relief valves where the valve seat is a replaceable valve seat insert mounted in the bore.

Yet other embodiments provide such pressure relief valves where the valve seat is a cylindrical sleeve insert carried within an enlarged diameter portion of the bore. The sleeve insert has a pressure seal mounted in its inner circumference.

Further embodiments provide such pressure relief valves where the valve seat is provided in a first bore extending from one of the inlet or the outlet, the valve stem is mounted to reciprocate co-axially with the first bore, and the other of the inlet or the outlet has a second bore extending normally to the first bore.

Additional embodiments provide such pressure relief valves where the valve body is integral with the valve stem.

Other embodiments provide such pressure relief valves where the valve body is replaceably coupled to the valve stem.

Still other embodiments provide such pressure relief valves where the valve body is threaded to a distal end of the valve stem.

Further embodiments provide such pressure relief valves where the valve seat has a seat surface facing the valve body and the valve body bears on the seat surface.

Additional embodiments provide such pressure relief valves where the valve stem is in an extended position in the closed position and is in a retracted position in the open position.

Other embodiments provide such pressure relief valves where the valve stem, in its closed position, extends beyond the bonnet into the housing of the valve fitting, and the valve actuator is provided with pressure seals between the valve stem and the bonnet to isolate the resilient element and the electromagnet from fluid in the flow path.

Still other embodiments provide such pressure relief valves where the valve comprises a first bore extending along a primary axis of the valve and a second bore intersecting the first bore. The valve seat is a cylindrical sleeve insert carried within an enlarged diameter portion of the first bore proximate to the intersection between the first bore and the second bore. The sleeve insert has a pressure seal mounted in its inner circumference. The valve body is a plug mounted on a distal end of the valve stem. In its closed position, the valve stem extends across the intersection such that the plug extends into the sleeve insert. In its open position, the valve stem retracts into the bonnet such that the plug is withdrawn from the sleeve insert.

Yet other embodiments provide such pressure relief valves where the first bore and the second bore are normal to each other.

Further embodiments provide such pressure relief valves where the first bore extends from the outlet and the second bore extends from the inlet or where the first bore extends from the inlet and the second bore extends from the outlet.

Other embodiments provide such pressure relief valves where the valve stem is mounted for linear reciprocation in a passage in the bonnet, and the passage in the bonnet is aligned axially with the first bore.

Still other embodiments provide such pressure relief valves where a replaceable wear sleeve is mounted in the intersection of the first bore and the second bore.

In other aspects and embodiments, the invention provides pressure relief valve systems for high-pressure fluid transportation systems. The pressure relief valve systems comprise a novel pressure relief valve and a control system for detection of the relief pressure and selectively energizing and de-energizing the electromagnet.

Other embodiments provide pressure relieve valve systems for high-pressure fluid transportation systems that comprise a novel valve and a control system operatively connected to the novel valve. The control system comprises a pressure sensor adapted to measure fluid pressure in the system, an electro-mechanical switch controlling current to the electromagnet, and a controller adapted to receive signals from the sensor and to generate control signals to the switch to selectively energize the electromagnet. Thus, the valve is held in its operationally shut state at pressures below the relief pressure by closing the switch and energizing the electromagnet. The valve is opened by opening the switch and de-energizing the electromagnet in response to detection of the relief pressure.

In still other aspects and embodiments, the invention provides flow lines for a high-pressure fluid transportation system. The flow lines comprise the novel pressure relief valves and valve systems.

In yet other aspects and embodiments, the invention provides high-pressure fluid transportation system. The systems comprise the novel flow lines. Other embodiments provide such systems where the system is a system for fracturing a well.

In further aspects and embodiments, the invention provides methods for controlling flow through a high-pressure fluid transportation system. The method comprises installing a novel pressure relief valve in fluid communication with the system and opening the valve upon detection of the relief pressure, thereby relieving excess pressure in the system.

Other embodiments provide such methods where the method comprises installing a novel pressure relief valve system where the valve is in fluid communication with a fluid conduit in the system. The fluid pressure in the conduit is below the first fluid pressure such that the valve is in its normally shut state. The electromagnet then is energized to place the valve in its operationally shut state and fluids are flowed through the conduit at high pressures. The electromagnet is de-energizing if the fluid pressure in the conduit is equal to or greater than the relief pressure.

Finally, still other aspects and embodiments of the invention will have various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the way it may be practiced. The subject invention encompasses other embodiments consistent with the claims set forth herein.

Figure 1:
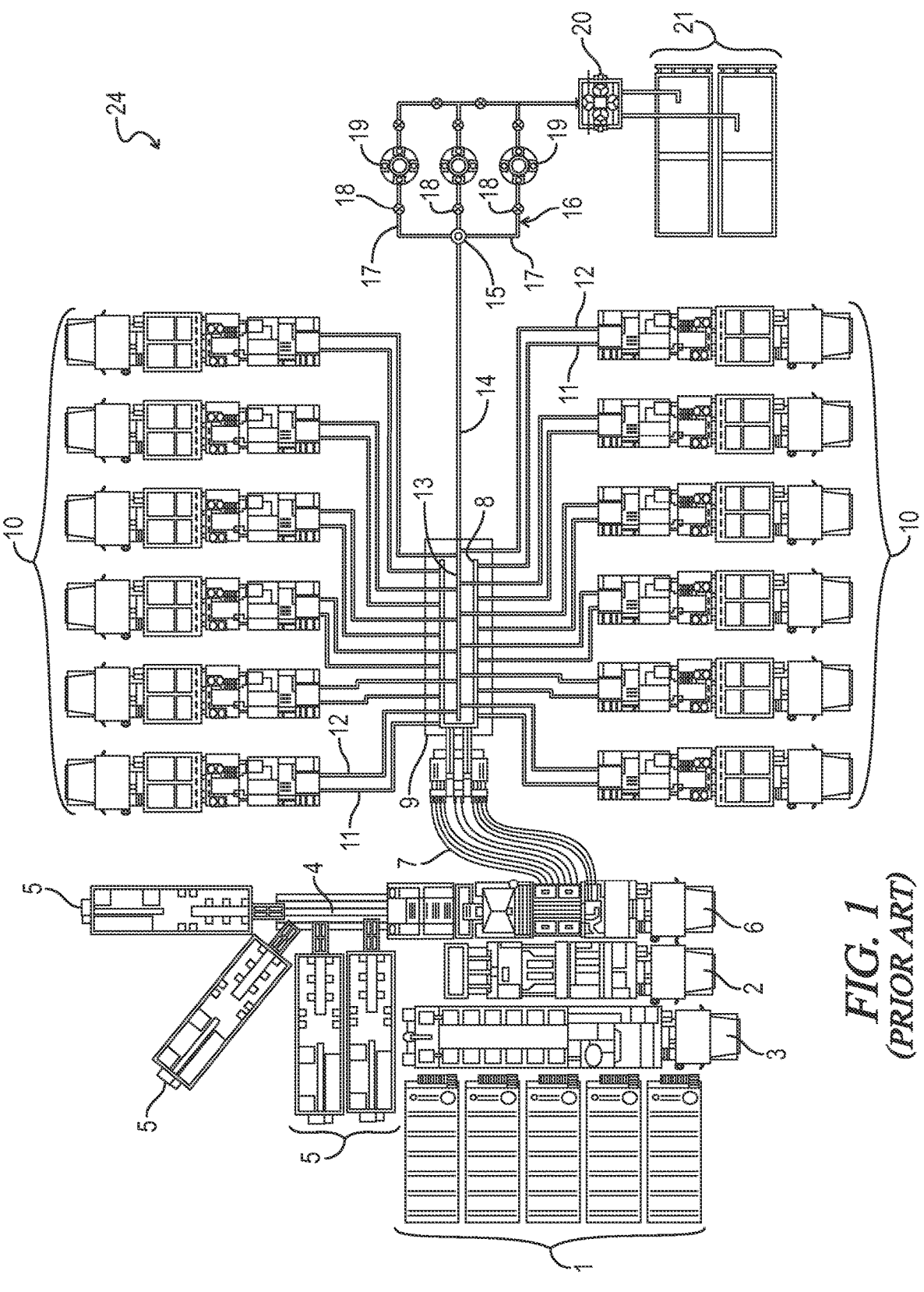
FIG. 1 (prior art) is a schematic view of a system 24 for fracturing a well and receiving flowback from the well, which system 24 includes a high-pressure flow line 14 feeding a zipper manifold 16 that can selectively divert fluid into three well heads 19.

In the drawings and description that follows, like parts are identified by the same reference numerals. The drawing figures are not necessarily to scale. Certain features of the embodiments may be shown in exaggerated scale or in somewhat schematic form. Some details of conventional design and construction may not be shown in the interest of clarity and conciseness.

DESCRIPTION OF ILLUSTRATIVE EMBODIMENTS

The subject invention, in various aspects and embodiments, is directed generally to pressure relief valves for flowlines, and especially for high-pressure flowlines. More particularly, it provides valves that are designed to provide reliable, accurate, precise, and rapid actuation to relieve excessive pressure even when used in fluid transportation systems, such as systems for fracturing oil and gas wells, that convey abrasive and corrosive fluids at high pressures and flow rates. Specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

Broad embodiments of the novel valves are directed to valves that may be tapped into flow lines. They are normally shut and are adapted to open at a threshold pressure in the flow line, what will be referred to as a predetermined relief pressure. The valves comprise a valve actuator. The valve actuator has a resilient member, such as a spring or a gas-charged bellows or piston, that applies a mechanical force to bias a reciprocating valve stem in a closed position. The actuator also has an electromagnet that, when energized, applies a magnetic force to the valve stem. The electromagnetic force also biases the valve stem in its closed position. The combined mechanical and magnetic force is sufficient to hold the valve stem in its closed position at pressures above the relief pressure. The mechanical force generated by the resilient member, however, is not sufficient alone to hold the valve stem in its closed position at the relief pressure. It allows the valve to open at pressures significantly below the relief pressure. Thus, the valve may be held in a normally-shut operational state by energizing the electromagnet. When the relief pressure is detected, the electromagnet can be deenergized to allow the valve stem to move to an open position, allowing the valve to open rapidly.

The novel pressure relief valves may be used in a variety of systems. They are particularly useful in high-pressure flow lines that are common in chemical and other industrial plants, on marine dredging vessels, strip mines, and especially in the oil and gas industry. Certain embodiments are particularly well suited as components of temporary pipe and flow line installations. Hydraulic fracturing systems, such as those shown in FIG. 1, are a very common application where pressure relief valves are a practical necessity. They may be tapped into the high-pressure side of a frac system. If operating pressures reach a specified maximum pressure, the relief pressure $P_R$, the valve will open rapidly and divert fluid from, and reduce pressure in the high-pressure side before the relief pressure $P_R$ is exceeded.

Figure 2:
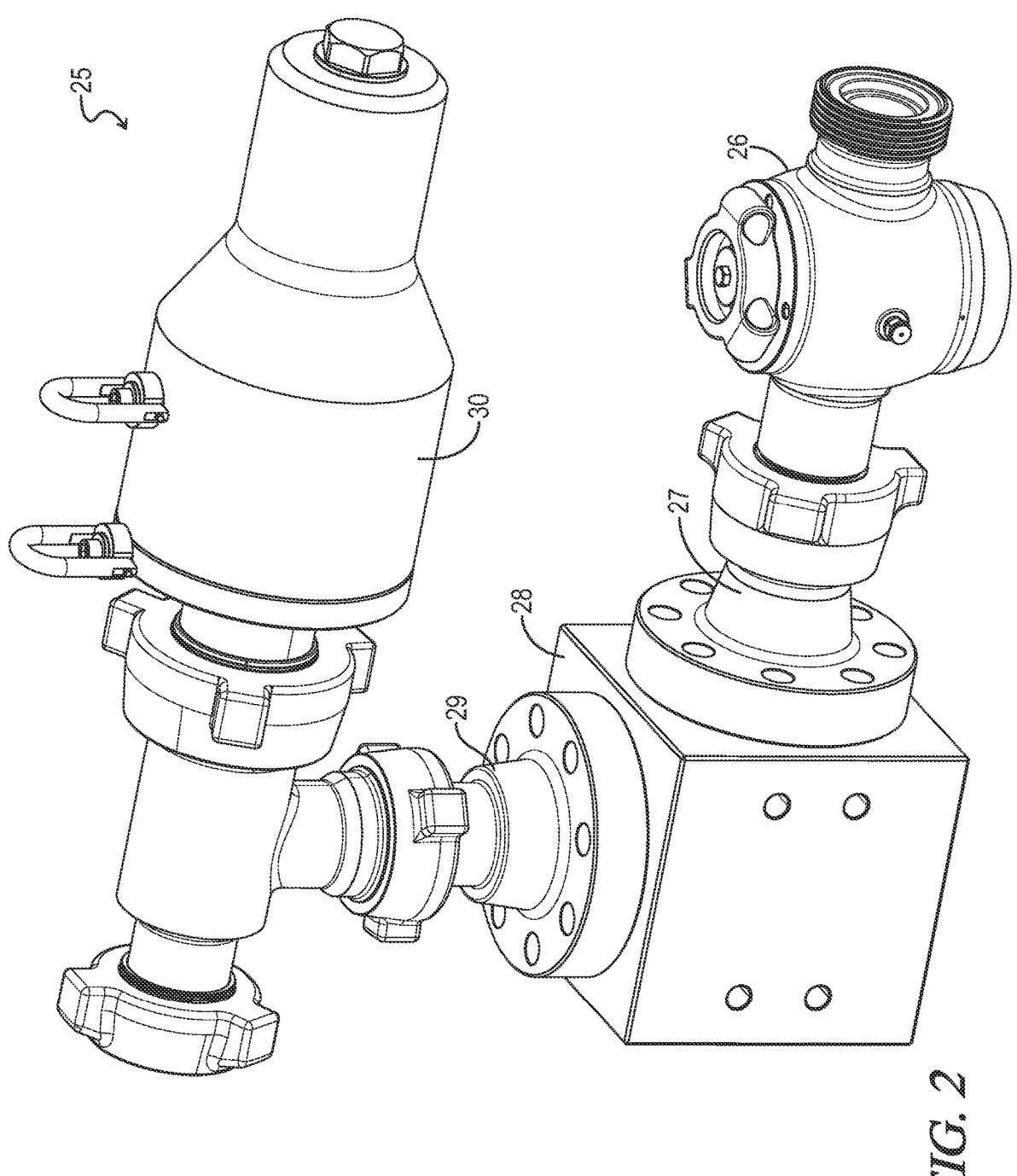
FIG. 2 is an isometric view of a flowline assembly 25 incorporating a first preferred embodiment 30 of a pressure relief valve of the subject invention.

A first preferred embodiment 30 of the novel pressure relief valves is shown in FIGS. 2-7. Pressure relief valve 30 may be incorporated, for example, in the frac system 24 shown in FIG. 1 as part of a flowline assembly 25. Flowline assembly 25 is shown in FIG. 2. As shown therein, flowline assembly 25 includes a plug valve 26, a first adapter fitting 27, a 90° elbow 28, a second adapter fitting 29, and novel pressure relief valve 30, all connected in series. Flowline assembly 25 may be tapped into a high-pressure conduit in frac system 24, such as flow line 14 which runs from frac manifold 9 to goat head 15. A tee fitting may be used to connect a tap line from flow line 14 to plug valve 26 in flowline assembly 25. Plug valve 26 will be open during operations, but it may be closed to take valve 30 offline for servicing or replacement. Pressure relief valve 30 may be connected at its downstream end to a bleed-off line. The bleed-off line typically discharges any flow released by pressure relief valve 30 into a tank or pit, such as flowback tanks 21. Valve 30 will open if excess pressure is detected in flow line 14 allowing flow to be diverted. Once the conditions giving rise to the excess pressure have been corrected, valve 30 may be closed to resume fracturing.

When novel pressure relief valve 30 is assembled into a frac system it preferably will be rated for high pressures, that is, rated pressures of at least about 6,000 psi. For many frac jobs, it may have to be rated for pressures of 10,000 psi, 15,000 psi, or even 20,000 psi. Pressure relief valve 30 and other embodiments of the novel pressure relief valves, however, may be rated for low pressure service (from about 1,000 to about 2,000 psi) or for medium pressure service (from about 2,000 to about 6,000 psi) and used in lower pressure systems. It will be appreciated, however, that what is characterized as "low-pressure" in frac systems, is actually extremely high pressure as compared to many common fluid transportation systems, such as those that transport water and steam.

Frac systems are intended for temporary use and will be assembled and disassembled at different well sites as needed. Thus, they are assembled on site from a large number of individual frac iron components and subassemblies of individual components. The components, including valves and other flow control devices, typically will be assembled with various types of unions. Unions allow the components to be connected ("made up") and disconnected ("broken down") relatively quickly, more quickly than threaded connections that may be preferred for permanent installations.

The three types of unions commonly used in frac systems are hammer (or "Weco®") unions, clamp (or "Grayloc®") unions, and flange unions. Though spoken of in terms that may imply they are discreet components, unions are actually interconnected subassemblies of the components joined by the union. One sub will be on one component, and a mating sub will be on the other. The subs then will be connected to each other to provide the union. The novel valves preferably are provided with such unions to facilitate their installation in a frac system.

Figure 3:
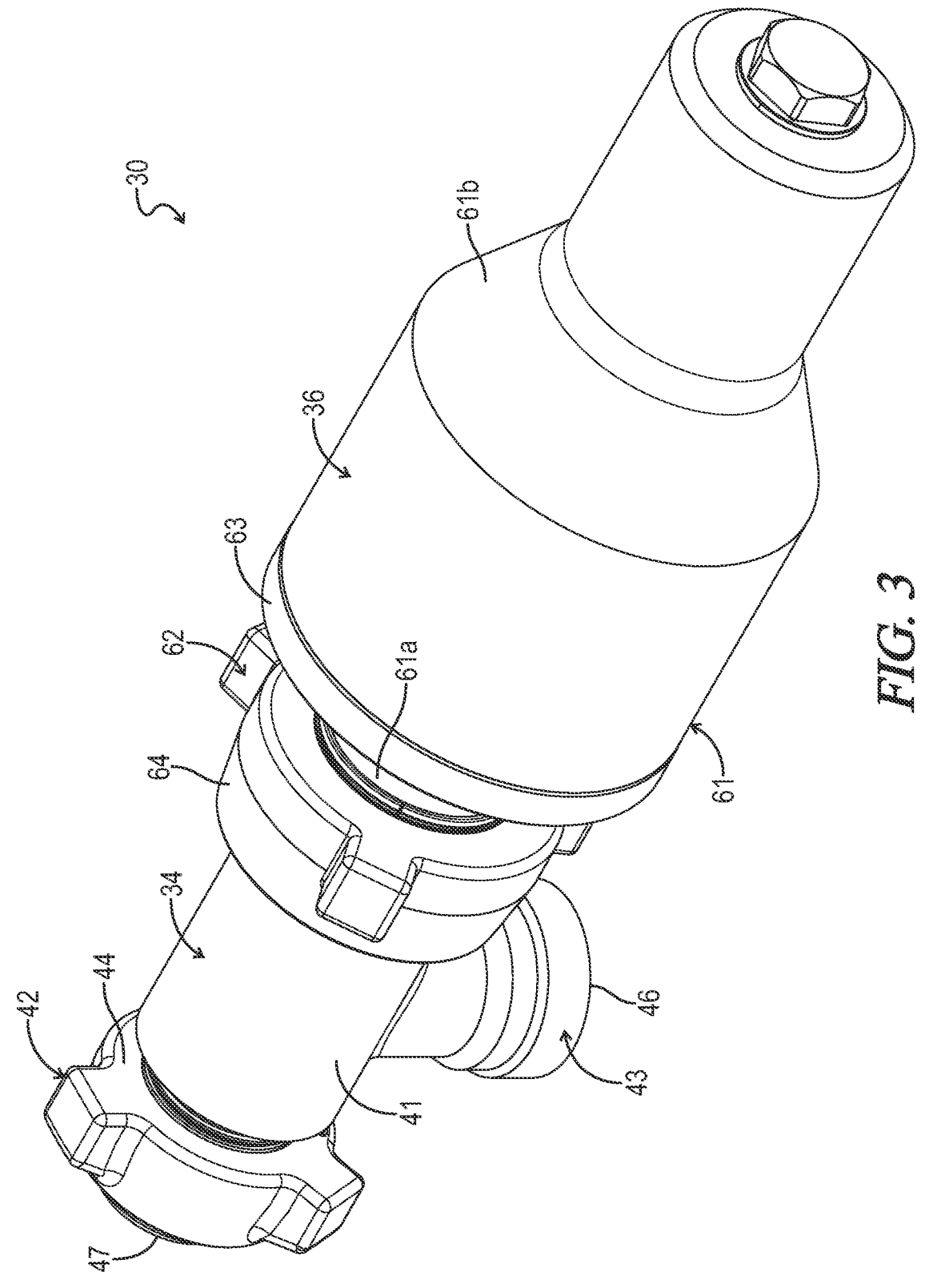
FIG. 3 is an isometric view of novel pressure relief valve 30 shown in FIG. 2.

For example, as may be seen in FIG. 3, novel pressure relief valve 30 generally comprises a valve fitting 34 and a valve actuator 36. Valve fitting 34 comprises a housing 41 that is provided with hammer union subs. One end of housing 41 is provided with a male hammer union sub 42 and another end is provided with a female hammer union sub 43. As is typical, male hammer union sub 42 has a large wing nut 44 carried on housing 41 around a segmented collar 45. A union will be made up by threading wing nut 44 onto external threads on a female hammer union sub of another flowline component, such as an upstream shut-off valve in a tap line running from high-pressure flow line 14. Tightening wing nut 44 will cause the ends of the mated components to bear on and seal against each other. Female hammer union 43 will be assembled in a like manner to a male hammer union sub of a downstream flowline component, such as a bleed-off line.

Hammer unions subs 42 and 43 are of conventional design. Preferably, they are constructed as disclosed in U.S. Pat. No. 10,808,871 to Duy D. Nguyen, but other conventional designs may be used. Likewise, if desired, the novel pressure relief valves may be assembled into flow lines by conventional clamp or flange unions, by threaded connections, welding, or by other conventional methods and apparatus. It also will be appreciated that the figures illustrate the novel valves as oriented horizontally. That will be the orientation in which they typically will be installed in a system, but they may be installed with a vertical orientation as well.

As best appreciated from FIGS. 4-7, valve fitting 34 of novel pressure relief valve generally comprises fitting housing 41, a valve seat 51, a valve body 52, and a flowpath wear sleeve 54. Fitting housing 41 comprises the major portion of valve fitting 34 and defines many of its features. It is the primary structure to which other flowline components in frac system 24 will be connected, for example, through hammer union subs 42 and 43 as described above. It also provides the structure in which the other components of valve fitting 34 are assembled and the structure to which valve actuator 36 will be mounted. Given that valve 30 preferably is designed for high-pressure applications, fitting housing 41 will be fabricated with relatively thick walls from high-tensile material.

In particular, as seen in the figures, fitting housing 41 provides a valve inlet 46, a valve outlet 47, and a receptacle 48 in which valve actuator 36 is mounted. A bore 56 extends from inlet 46 along a secondary axis normal to a primary axis X of valve 30. Inlet bore 56 provides a conduit for fluids entering valve 30. Another bore 57 extends from outlet 47 along primary axis X. It intersects with bore 56 extending from inlet 46 and provides a conduit for fluids to exit valve 30. Bores 56 and 57, as is typical, are generally cylindrical and to a great extent uniformly so. They usually will have a diameter generally equal to the flow line in which valve 30 is tapped. That will help minimize erosion in and pressure drop through valve 30. Conduits with other geometries and sizes may be used, however, if desired.

In any event, fitting housing 41 thus defines a flow path through valve 30 between inlet 46 and outlet 47. As described further below, fluid may flow in either direction through the flow path in valve 30. Thus, the designations of "inlet" and "outlet" are in a sense arbitrary and are made for convenience in describing the novel valves. Valve 30 may be tapped into, for example, flow line 14 with the end designated as outlet 47 serving as the inlet for fluid. The other end designated as inlet 46 will provide the valve outlet.

Fluid flowing through valve 30 will have an erosive and corrosive effect. Such effects are most pronounced where flow is turbulent, such as at the intersection of inlet bore 56 and outlet bore 57. Thus, as exemplified, replaceable wear sleeve 54 is mounted in the flow path at the bores' intersection. As best appreciated from FIG. 7, wear sleeve 54 has a generally open-cylindrical configuration providing a central conduit. A circular opening extends through the side of wear sleeve 54. The opening allows fluid from inlet bore 56 to flow into the central conduit and thence into outlet bore 57. In the event of excessive wear, sleeve 54 may be replaced.

A mechanism preferably is provided to make it easier to position wear sleeve 54 in the intersection so that its side opening is properly aligned with inlet bore 56. For example, as appreciated from the cross-sectional views of FIGS. 5-6 and parts view of FIG. 7, wear sleeve 54 may be provided with a slot extending across its upper surface. A pin may be mounted, for example, in a bottomed hole in housing 41 such that it extends into the intersection. The pin is located such that when the slot in wear sleeve 54 is aligned with the pin as wear sleeve 54 is installed, the side opening in wear sleeve 54 will be precisely aligned with inlet bore 56. Other alignment mechanisms may be used. Likewise, if desired, a replaceable wear sleeve may be omitted from the novel pressure relief valves.

Figure 4:
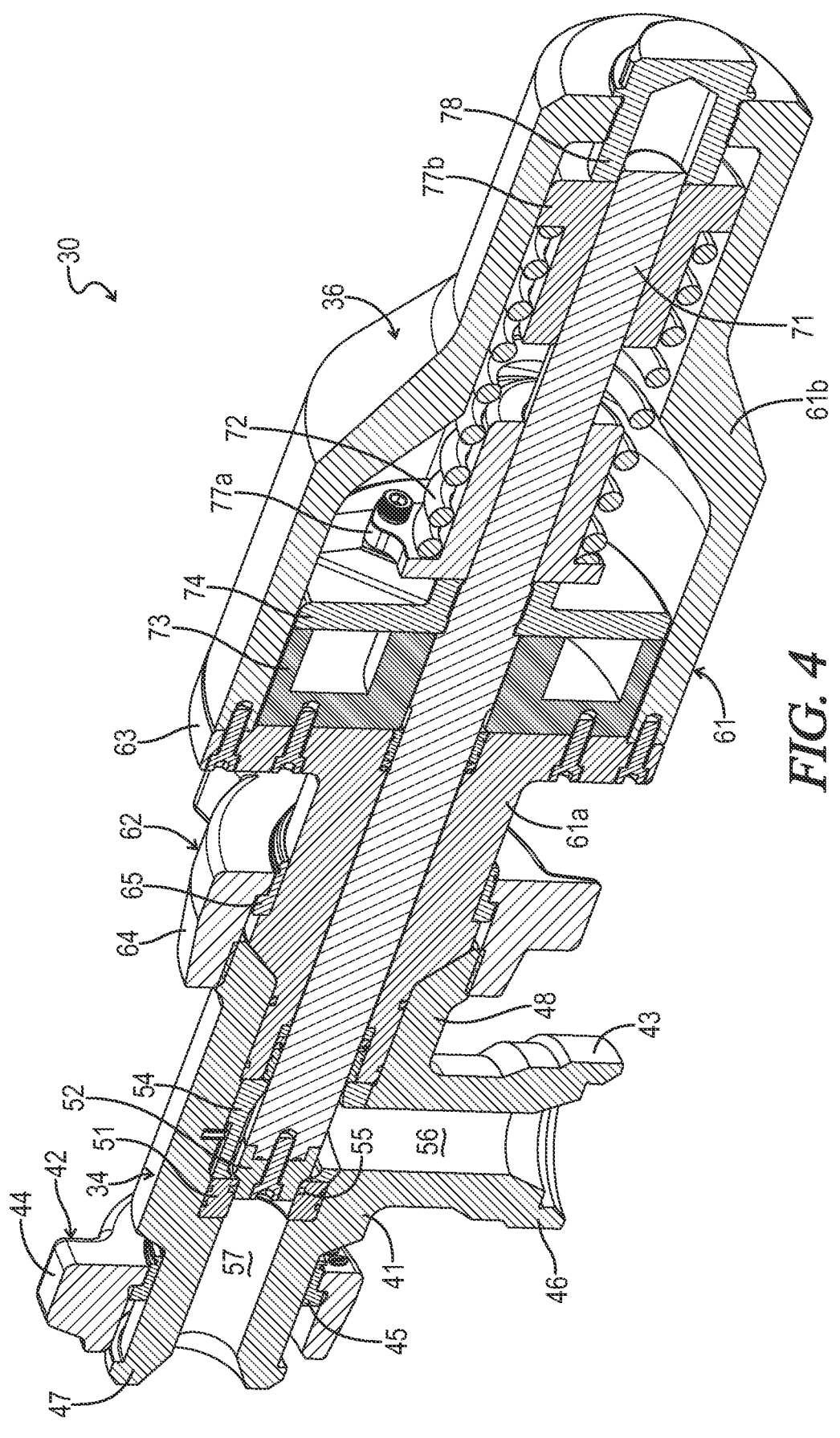
FIG. 4 is an isometric, cross-sectional view of novel pressure relief valve 30 shown in FIGS. 2 and 3 in which valve 30 is shown in its shut state.
Figure 5:
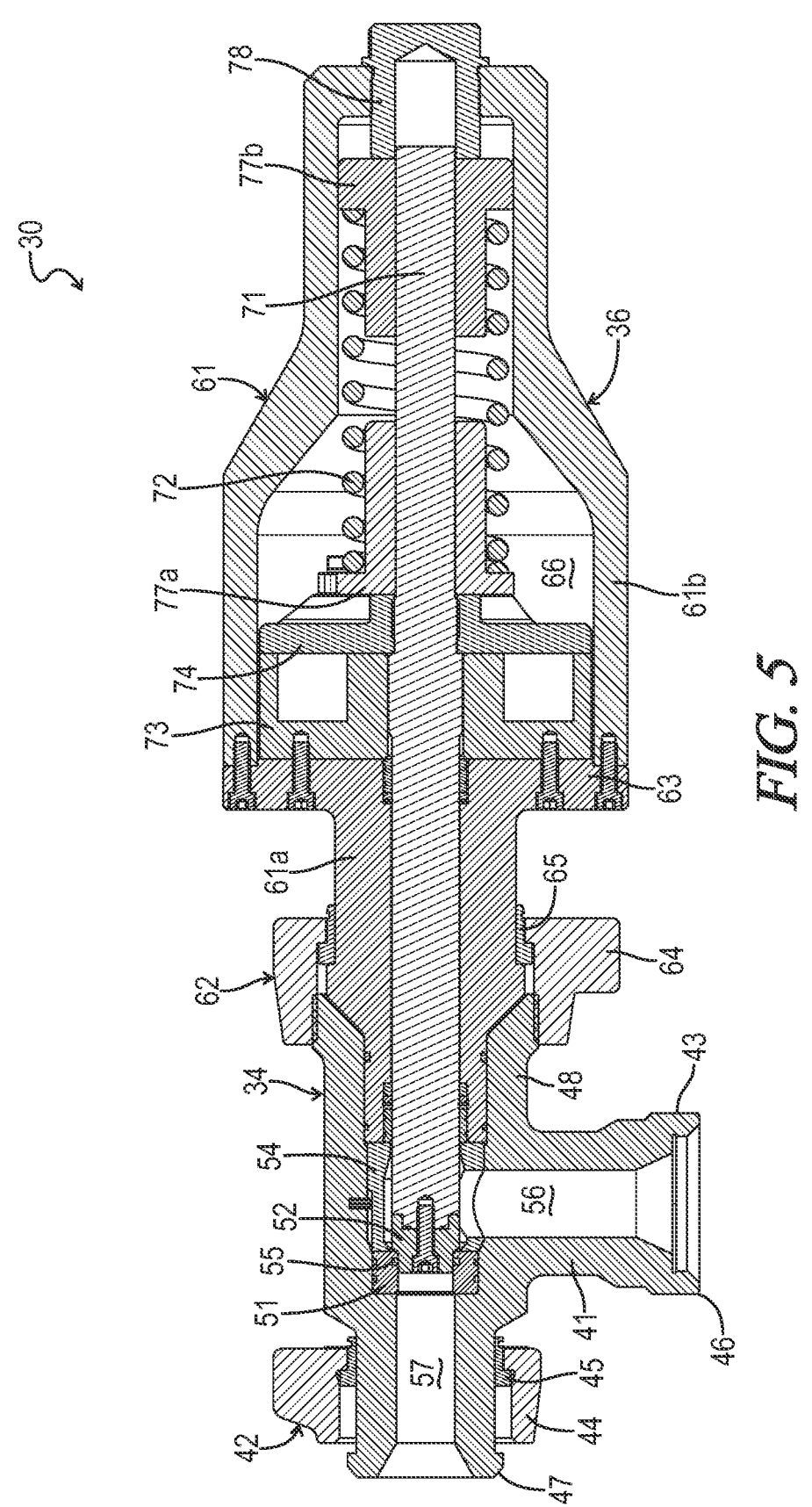
FIG. 5 is a cross-sectional view of novel pressure relief valve 30 in its shut state.
Figure 6:
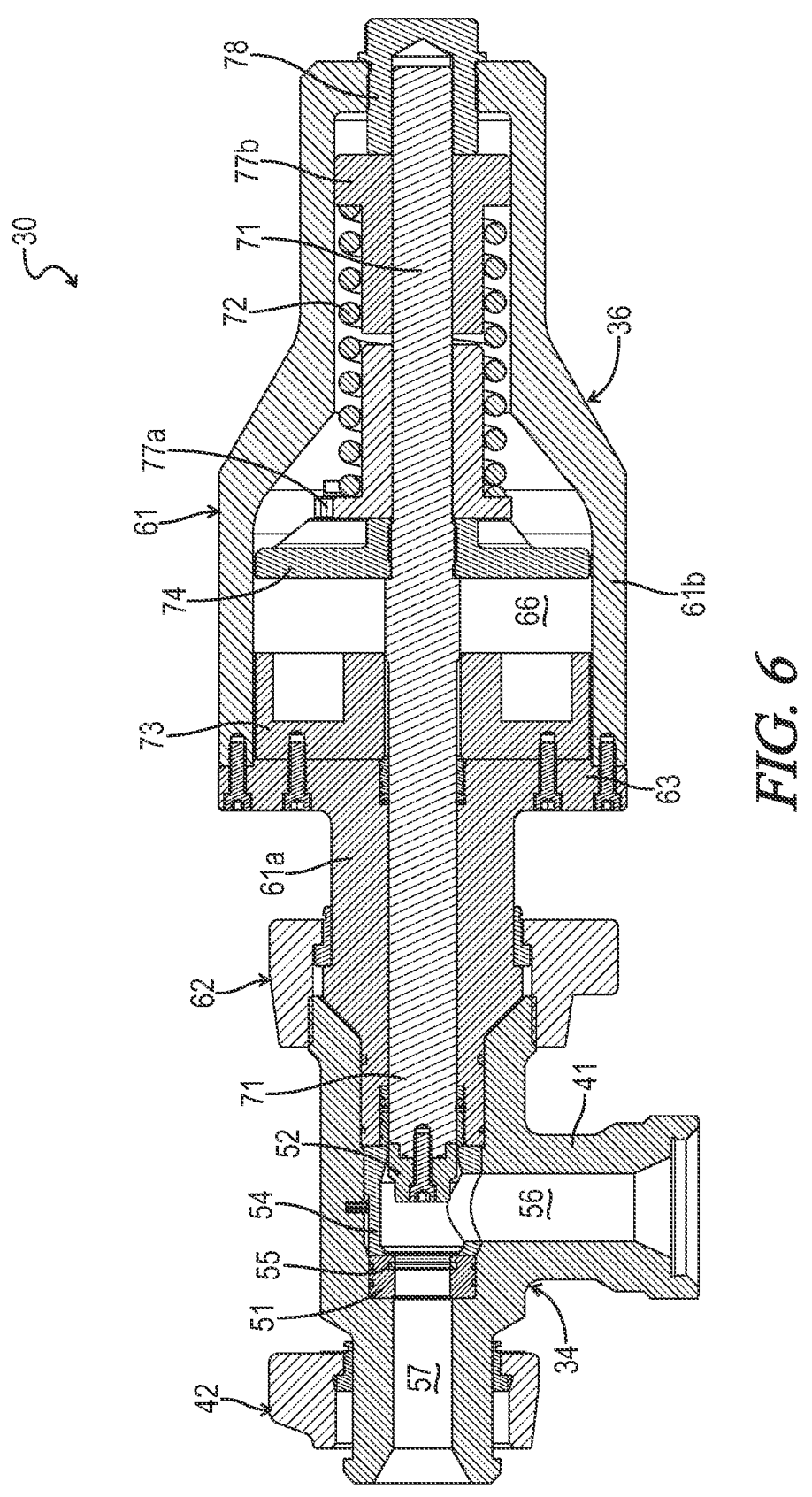
FIG. 6 is a cross-sectional view of novel pressure relief valve 30 in its open state.

Valve actuator 36, as may be seen in FIGS. 4-6, generally comprises a bonnet 61, a valve stem 71, a spring 72, an electromagnet 73 (simplified depiction), a ferromagnetic plate 74, spring retainers 77, and an adjusting nut 78. Bonnet 61 comprises the major portion of valve actuator 36 of relief valve 30. It is the primary structure in which the other components of valve actuator 36 will be assembled. Bonnet 61 also provides the structure by which valve actuator 36 will be assembled to valve fitting 34.

For example, bonnet 61 comprises the assembly of two subs, a nipple 61a and a main sub 61b. Both nipple 61a and main sub 61a have a profiled, generally open-cylindrical configuration. Nipple 61a has a generally cylindrical passage in which valve stem 71 is carried. The passage extends along primary axis X of valve 30. The inner end of nipple 61 is provided with an annular flange 63. Flange 63 allows nipple 61a to be connected to bonnet main sub 61b, for example, by threaded connectors extending through flange

63 and into main sub 61b. Flange 63 on nipple 61a and main sub 61b define a generally cylindrical, central chamber 66 through which valve stem 71 extends. Spring 72, electromagnet 73, and ferromagnetic plate 74 are mounted inside chamber 66 and around valve stem 71.

The outer circumference of the distal end (left side in the figures) of nipple 61a is profiled to allow it to fit closely within housing receptacle 58 of valve fitting 34. The central portion of nipple 61a tapers inward toward a reduced diameter portion. The tapered portion of nipple 61a bears on a mating taper provided in housing receptacle 48, while the reduced diameter portion fits closely within receptacle 48. Nipple 61a thus may be inserted into housing receptacle 48, allowing valve actuator 36 to be assembled to valve fitting 34 by a hammer-type union. Preferably, as shown, static pressure seals, such as elastomeric O-rings, square cut rings, or lobed rings, are provided between the outer circumference of nipple 61a and housing receptacle 48.

More specifically, receptacle 48 of fitting housing 41 is provided with external threads like those of female hammer union sub 43 on inlet 47 of fitting housing 41. A hammer-type union male sub 62 is provided on the distal end of nipple 61a. Bonnet wing nut 64, similar to wing nut 44 of male hammer union sub 42 on outlet 47 of fitting housing 41, is carried loosely around the central portion of nipple 61a. A segmented collar 65, similar to segmented collar 45 in hammer union sub 42, is assembled outward of wing nut 64, but behind an annular, radially-extending boss, by sliding bonnet wing nut 64 inward. Wing nut 64 then is slipped over segmented collar 65 and engaged with the external threads of receptacle 48 on fitting housing 41. As wing nut 64 is tightened, the distal end of nipple 61a will be drawn into receptacle 48 and valve actuator 36 secured to valve fitting 34.

Valve seat 51 is mounted in the flow path through valve 30. Valve body 52, as described further below, is selectively seated on valve seat 51 to either open or shut off flow through valve 30. A cylindrical valve seat may be formed in housing 41 of valve fitting 34 as an integral feature, for example, of outlet bore 57. As noted, however, fluid flowing through valve 30 has an erosive and corrosive effect on valve 30 after extended service. Thus, valve seat 51 preferably, as shown, is a separate, replaceable component.

For example, valve seat 51 is an insert, such as a cylindrical, sleeve insert. It is carried within an enlarged diameter portion of outlet bore 57. Preferably, radial pressure seals, such as elastomeric O-rings, square cut rings, or lobed rings, are provided between the outer circumference of valve seat 51 and the inner circumference of the enlarged diameter portion of bore 57. For example, a pair of O-rings may be mounted in annular glands provided in the outer circumference of valve seat 51. When valve actuator 36 is assembled to valve fitting 34, valve seat 51, as well as wear sleeve 54 will be secured in fitting housing 41. That is, the distal end of nipple 61a of valve actuator 36 bears on and captures wear sleeve 54, which in turn bears on and captures valve seat 51.

Valve body 52, as described further below, is operationally coupled to reciprocating valve stem 71 of valve actuator 36. Thus, as may be seen by comparing FIGS. 5-6, valve body 52 may be selectively seated on valve seat 51 to either open or shut off flow through valve 30. Valve body 52, for example, is a generally cylindrical plug that is sized to fit closely within valve seat 51. Thus, when it is extended into and within valve seat 51, valve body 52 will place valve 30 in a shut state in which the flow path through fitting housing 41 is blocked such that fluid cannot flow through valve 30.

A radial pressure seal 55, such as an elastomeric O-ring, square cut ring, or lobed ring, preferably is provided between valve seat 51 and valve body 52 to minimize leakage through the clearance between valve seat 51 and valve body 52. For example, as seen best in FIGS. 5-6, an elastomeric O-ring 55 may be mounted in an annular gland on the inner circumference of valve seat 51. Other types of conventional seals and annular packings are known and may be used if desired. A hard seal ring made, for example, from engineering plastics such as polyether ether ketone (PEEK) may be used. Back up rings also may be used with elastomeric seal rings.

Valve body 52 preferably, as shown, is releasably coupled to the distal end of valve stem 71, that is, the end of valve stem 71 that is extendable beyond bonnet 61 of valve actuator 36 and into valve fitting 31. For example, the distal end of valve stem 71 has a short, axially extending cylindrical boss. A skirt on the mating end of valve body 52 fits closely around the boss on valve stem 71 and is releasably coupled thereto, for example, by a threaded fastener. In the event valve body 52 suffers excessive wear, it may be replaced. Of course, other coupling designs may be used or, if desired, valve body 52 need not be replaceable. It may be an integral feature of valve stem 71.

Likewise, if desired, other conventional valve seat and body designs may be utilized in the novel pressure relief valves. For example, the valve seat and valve body may be provided with facing, radially extending beveled or flat annular seal surfaces similar to the valving surfaces provided in globe valves. Globe-type facing valving surfaces may be provided in lieu of, or in addition to the bore and plug design of valve seat 51 and valve body 52. In such designs, the seal surface on the valve body will bear axially on the seal surface of the valve seat.

As will be appreciated by comparing FIGS. 5 and 6, valve stem 71 is mounted in valve actuator 36 for linear reciprocation between an extended, closed position and a retracted, open position. In its closed position, valve stem 71 seats valve body 52 on valve seat 51 to shut off flow through the flow path and place valve 30 in its shut state. When valve stem 71 is in its open position, valve body 52 is retracted and unseated from valve seat 51. Fluid can flow through the flow path and valve 30 is in its open state.

More specifically, valve stem 71 extends axially through and, when extended, beyond bonnet 61 of valve actuator 36. It fits closely within the axial passage provided in nipple 61a. The passage in nipple 61a is aligned axially with bore 57 extending from outlet 47 and guides valve stem 71 as it reciprocates. Preferably, guide rings are provided within the passage to increase the ease and reliability with which valve stem 71 reciprocates. Pressure seals also preferably are provided between the passage walls and valve stem 71 to minimize, if not eliminate leakage of fluid from valve fitting 31 into valve actuator 36.

Figure 7:
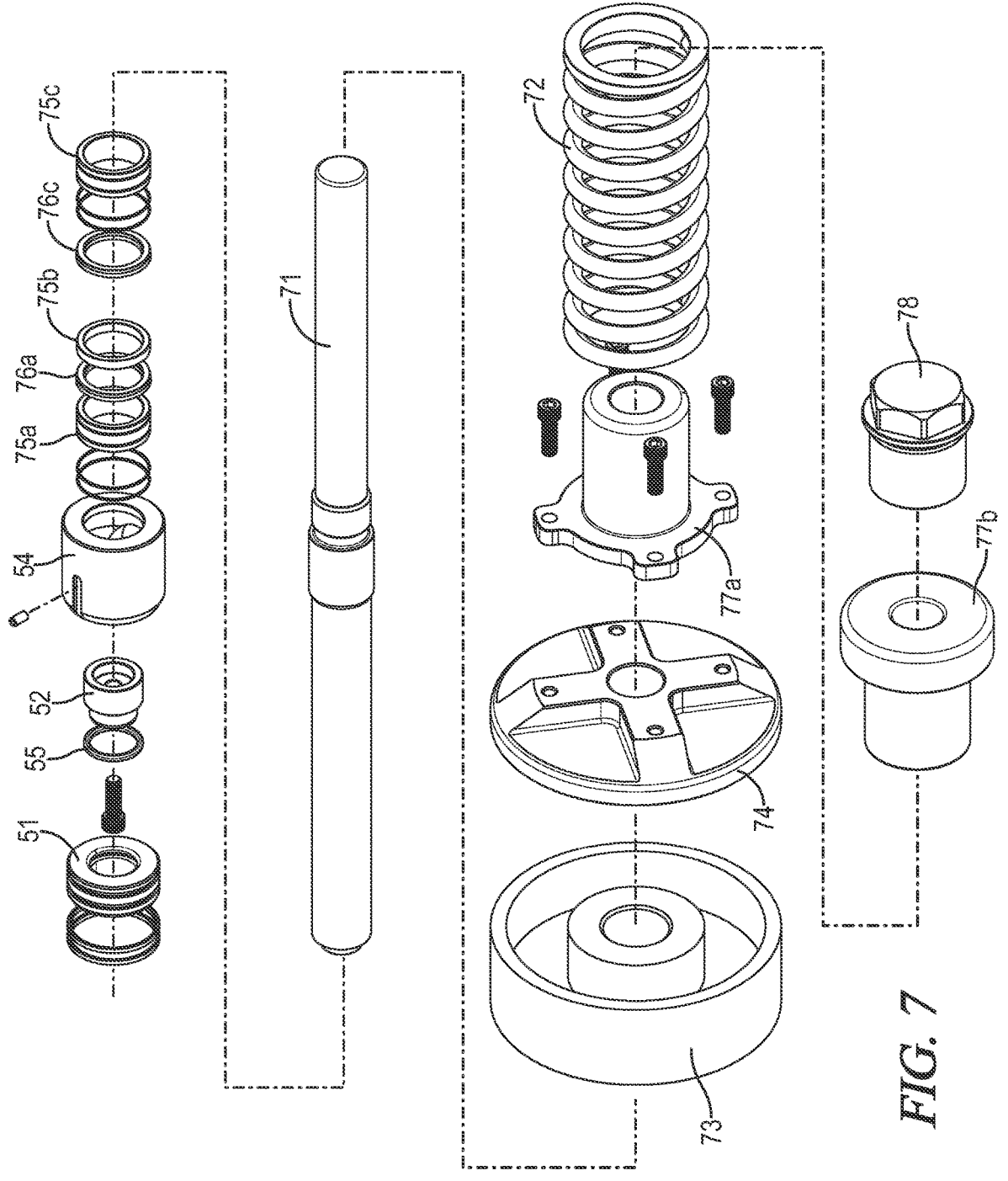
FIG. 7 is an isometric, exploded view of internal components of novel pressure relief valve 30.

For example, as may be seen best in FIGS. 5-7, valve actuator 36 is provided with a pair of stem guide rings 75a/b and a stem pressure seal 76a at the distal end of nipple 61a and a stem guide ring 75c and a stem pressure seal 76c near the flanged-end of nipple 61a. Stem guide rings 75 are mounted, for example, in annular rabbets provided in the walls of the axial passage in nipple 61a. Stem seals 76 preferably are radial, reciprocating dynamic pressure seals, such as elastomeric cup-style seal rings having an integral backup ring to minimize extrusion of the seal under excessive pressure. Other seal designs and backup rings, however, may be used that provide a pressure seal and tolerate reciprocation of valve stem 71. Stem guide rings 75b/c on the low-pressure side of seals 76a/c also assist in further minimizing extrusion of seals 76a/c.

When in its extended, closed position, valve stem 71 extends beyond bonnet 61 and across the intersection of inlet bore 56 and outlet bore 57 in valve fitting 34. Valve body 52 is thereby inserted into valve seat 51 and engages pressure seal 55 therein to shut off flow through valve 30. When valve stem 71 is in its retracted, open position, valve stem is withdrawn fully into bonnet 61 such that it is not exposed to the corrosive and erosive effects of fluid flowing through valve 30. Valve body 52 also is largely clear of the intersection, thereby reducing constriction of flow through the intersection. It will be appreciated, however, that valve 30 may be configured such that valve body 52 is fully retracted into bonnet 61. In that event, flow through valve seat 51 and the flow path in valve 30 is substantially unrestricted by valve body 52. The sealing surfaces of valve body 52 also would be protected from fluid flowing through valve 30.

Spring 72 and electromagnet 73 of valve actuator 36 cooperate to control the reciprocation of valve stem 71 and, in turn, opening and shutting of valve 30. Spring 72 applies a mechanical force that biases valve stem 71 in its extended, closed position. Electromagnet 73, when energized, applies a magnetic force that also biases valve stem 71 in its extended, closed position. The mechanical and electromagnet forces are coordinated and controlled to ensure that valve 30 will remain in its shut state at desired operating pressures, what will be referred to as its operationally shut state, but will open reliably and rapidly if pressure within the system meets or exceeds the predetermined relief pressure $P_R$.

For example, as best appreciated from FIG. 7, electromagnet 73 has a generally annular configuration. It is mounted inside chamber 66 in main sub 61b of bonnet 61 and secured to flange 63 on nipple 61a, for example, by threaded fasteners extending through flange 63 and into the base of electromagnet 73. Valve stem 71 extends through and reciprocates within the central passage in electromagnet 73.

Ferromagnetic plate 74 has a generally annular, disc shape. It is fixedly mounted on and around valve stem 71, for example, by threaded connectors, and is positioned axially on valve stem 71 such that when it bears on electromagnet 73, valve body 52 is seated on valve seat 51. Thus, when electromagnet 73 is energized, ferromagnetic plate 74 will be attracted to it, thereby generating a magnetic force biasing valve stem 71 in its extended, closed position.

Preferably, ferromagnetic plate 74 has a generally smooth, circular face oriented toward electromagnet 73, and its radius approximates the radius of electromagnet 73. That will maximize the attractive force generated when electromagnet 73 is energized. The face of plate 74 also preferably is provided with a very slight raised surface or surfaces that extend a slight axial distance away from the major surface of the face. The face of ferromagnetic plate 74 may be machined, for example, with a narrow, circular boss. A suitable circular boss, for example, would be virtually imperceptible at the scale of the figures referenced herein. The raised surface creates a very narrow, but extensive air gap between the face of ferromagnetic plate 74 and the face of electromagnet 73. The air gap will not significantly reduce the holding force created by electromagnet 73, but will allow ferromagnetic plate 74 to release from electromagnet 73 more rapidly when it is deenergized. Alternately, a narrow air gap may be provided by a slight, raised surface provided on the contact face of electromagnet 73 or by thin spacers.

Spring 72 is mounted around valve stem 71 on the other side of ferromagnetic plate 74 and between a pair of spring retainers 77. Valve stem 71 extends through central passages in retainers 77. One spring retainer 77a is mounted on ferromagnetic plate 74. The other spring retainer 77b is slideably carried around valve stem 71 and within a minor diameter portion of bonnet main sub 61b. Adjusting nut 78 is threaded into a threaded hole at the end of main sub 61b of bonnet 61 and bears on spring retainer 77b. As its name implies, adjusting nut 78 is used to adjust the axial position of spring retainer 77b within bonnet 61 and thus the compression applied to spring 72.

Spring 72 thus applies (through spring retainer 77a) a mechanical force on ferromagnetic plate 74 that biases valve stem 71 in its extended, closed position. Spring 72 will be selected, primarily in respect to its spring rate and force, so that when electromagnet 73 is not energized, the force generated by spring 72 will be sufficient to cause ferromagnetic plate 74 to bear on electromagnet 73 at pressures in frac system 24 below a seating pressure Ps. Valve stem 71 thus will be placed in its closed position, with valve body 52 seated on valve seat 51 and valve 30 placed in its normally shut state. Spring 72 also will be selected such that it allows valve stem 71 to fully retract.

Importantly, however, spring 72 will be selected and tuned such that the mechanical force applied by it is not sufficient to hold valve 30 in its shut state at operating pressures approaching relief pressure $P_R$ if electromagnet 73 is not energized. That is, pressure $P_1$, the pressure above which spring 72 allows valve stem 71 to retract and open valve 30, is below and, preferably, well below the predetermined relief pressure $P_R$. If electromagnet 73 is not energized, therefore, spring 72 will allow valve 30 to open at pressure $P_1$ well below the predetermined relief pressure $P_R$. If electromagnet 73 is energized, however, valve 30 will not open unless a pressure $P_2$, a pressure above and preferably well above relief pressure $P_R$, is exceeded.

While the resilient member of the novel valves preferably is a spring, such as spring 72, it will be appreciated that other resilient members may be used if desired. For example, conventional automatic check valves may use a gas-charged bellows or gas-charged piston to bias the valve stem. Such designs also may be used in the novel pressure relief valves.

Figure 8:
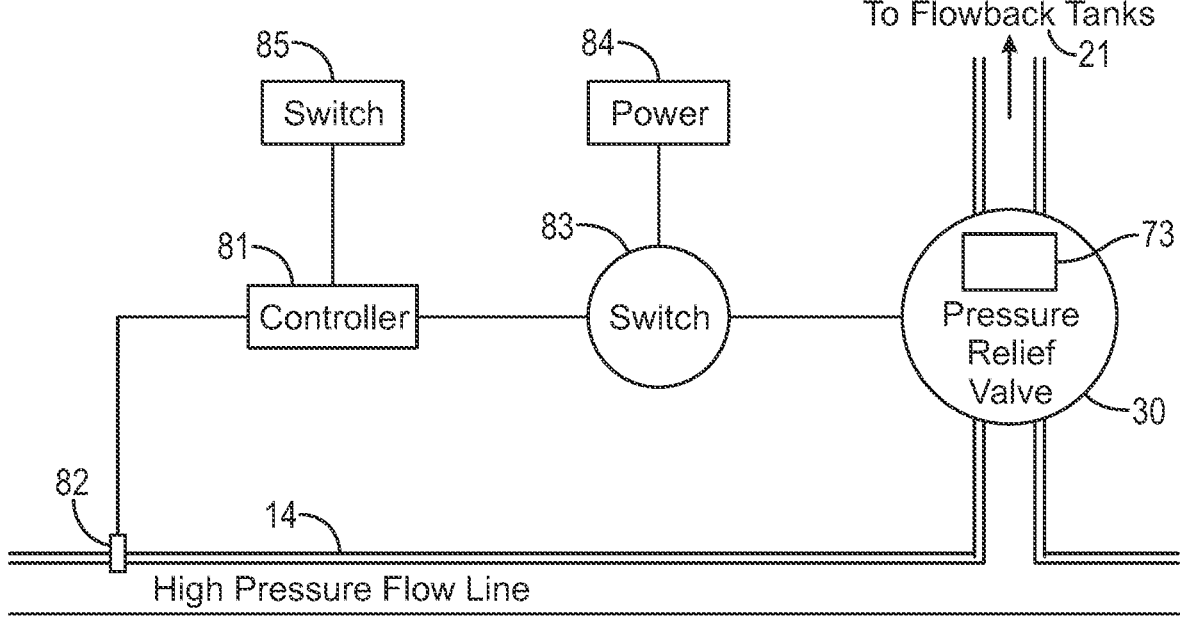
FIG. 8 is a schematic showing a control system 80 for a preferred embodiment 90 of the pressure relief valve systems of the subject invention.

Actuation of electromagnet 73 and opening of valve 30, for example, to relieve excess pressure in frac system 24, may be described in further detail by reference to FIG. 8. FIG. 8 shows schematically a preferred pressure relief valve system 90 comprising novel pressure relief valve 30 and a preferred system 80 for controlling and operating valve 30. Control system 80 is an electronically controlled system and generally comprises a controller 81, a pressure sensor 92, and a switch 93.

Controller 81 may be a printed circuit board controller. Preferably, however, it is a programmable logic controller or other programmable digital computer such as a laptop. Such controllers typically comprise a central processing unit (CPU), power supply, programming device, and input and output (I/O) modules. Sensor 82 is a pressure transducer or other conventional sensor for measuring fluid pressure. It is mounted in flow line 14 and connected to controller 81. Controller 81 controls switch 83 to energize and deenergize electromagnet 73.

Switch 83 may be, for example, a low-voltage electro-mechanical switch having a normally open relay, such as a mini ISO (cube) relay or a solenoid switch that is rated for continuous use. Switch 83 is installed in the line from power source 84 providing power to electromagnet 73. It may be installed proximate to electromagnet 73 or in a remote control booth or "doghouse." Switch 83 is triggered by controller 81 in response to input from pressure sensor 92. Preferably, as incorporated into control system 80, a second, manual switch 85 is provided to control switch 83 at the discretion of the operator.

Electromagnet 73 may be energized by an AC power source. An AC electromagnet can provide extremely rapid release of ferromagnetic plate 74. Its holding power, however, may suffer if it is energized for extended periods of time. Thus, power source 84 preferably provides DC power and electromagnet 73 will be a DC electromagnet. Other factors being equal, a DC electromagnet will provide a stronger magnet. A DC electromagnet, however, will have a residual electromagnetic field after it is de-energized and will create induced magnetism in ferromagnetic materials. Such effects vary depending, for example, on the ferromagnetic core of the electromagnet, the ferromagnetic material attracted to the electromagnet, the energizing power applied to the electromagnet, and the duration of energization. In any event, such effects can cause ferromagnetic plate 74 to stick briefly to electromagnet 73 after it is de-energized and delay opening of valve 30.

Thus, control system 80 preferably is adapted to automatically switch the polarity of, and reduce the power energizing electromagnet 73 prior to de-energizing it. Controller 81, for example, preferably comprises circuits controlling the polarity and levels of power provided to electromagnet 73. Prior to de-energizing electromagnet 73, controller 81 thus will be able to lower and reverse the polarity of power energizing electromagnet 73 to minimize the effects of residual and induced magnetism once electromagnet 73 is de-energized. Properly controlled, ferromagnetic plate 74 may tend to pop off electromagnet 73. In any event, such control circuits will enable valve 30 to open more quickly. Seating pressure $P_S$ of spring 72 also may be set closer to relief pressure $P_R$ as any tendency to stick is reduced.

Prior to commencement of fracturing operations, valve 30 will be in its normally shut state by virtue of the biasing force of spring 72. It can be placed in its operationally shut state by closing switch 83 to energize electromagnet 73. Switch 83 may be closed by the operator using manual switch 85 or by controller 81 in response to signals from sensor 82 indicative of specified pressure conditions in frac system 24. For example, controller 81 may trigger switch 83 and energize electromagnet 73 when pressures as detected by sensor 82 fall below seating pressure $P_S$ at which the mechanical force applied by spring 72 is sufficient to place valve 30 in its shut state. In any event, once switch 93 is closed, electromagnet 73 will hold valve stem 71 of valve actuator 36 in its closed position and valve body 52 on valve seat 51, thus placing valve 30 in its operationally shut state. When valve 30 is in its operationally shut state, unless electromagnet 73 is de-energized, the combined mechanical and electromagnetic biasing forces will hold valve 30 in its shut state beyond relief pressure $P_R$, that is, up to pressure $P_2$.

Once fracturing commences, signals from pressure sensor 92 will be monitored by controller 81 and compared to the predetermined relief pressure $P_R$. Relief pressure $P_R$ can be the pressure rating of flow line 14. Operators, however, typically will assemble frac system 24 such that its rating is comfortably above the pressures they anticipate will be required to fracture well 1. Relief pressure $P_R$ thus may be set at a desired maximum operating pressure for flow line 14 below the rated pressure for flow line 14. For example, if flowline 14 and the high-pressure side of frac system 24 is rated for 15,000 psi, relief pressure $P_R$ may be set at 15,000 psi or somewhat below that, such as 14,250 psi.

In any event, when pressure in excess of relief pressure $P_R$ is detected, controller 81 will de-energize switch 93, allowing it to return to its normally open state. In turn, electromagnet 73 will be de-energized. Fluid pressure in inlet 46 of valve 30 at that point will be well above pressure $P_1$ at which spring 72 allows valve 30 to open. Fluid pressure will easily and rapidly push valve body 52 and valve stem 71 beyond the intersection of inlet bore 56 and outlet bore 57 and back to its retracted position. Valve 30 will open fully and rapidly to relieve excess pressure in frac system 24.

Once pressure in frac system 24 drops below seating pressure $P_S$, spring 72 will return valve 30 to its normally shut state. Assuming the circumstances causing the unwanted increase in pressure have been addressed, and operations otherwise are ready to be restored, valve 30 again may be placed in its operationally shut state. Switch 93 will be closed to energize electromagnet 73 as described above.

Operators may have divergent preferences in selecting an appropriate seating pressure $P_S$, pressure $P_1$, pressure $P_2$, and relief pressure $P_R$. Spring 72 may be selected and tuned with adjusting nut 78, and electromagnet 73 selected in accordance with such preferences. For example, some operators may prefer to relieve only a few hundred psi of pressure to minimize disruption to fracturing operations. Seating pressure $P_S$ and pressure $P_1$ will be relatively high. Other operators may prefer to vent more pressure, perhaps down to approaching zero psi. More fluid necessarily is diverted. Seating pressure $P_S$ and pressure $P_1$ will be relatively low.

As noted above, valve 30 may be assembled into flow line 14 with either of its ends serving as the inlet and the other as outlet. Valve 30 has been exemplified with the end extending along the secondary axis normal to primary axis X serving as inlet 46. As such, an annular shoulder provided by a reduced diameter portion at the end of valve body 52 is exposed to pressure in flowline 14. When valve 30 is assembled such that outlet 47 (the end extending along primary axis X) serves as the inlet, the outer face of valve body 52 is exposed to pressure within flowline 14.

The surface area of the outer face being greater than that of the shoulder, the force generated against valve body 52 at a given pressure will be greater when outlet 47 serves as the inlet. Valve 30, therefore, will open somewhat more rapidly than when inlet 46 in fact is the inlet. On the other hand, when inlet 46 serves as the inlet, the magnetic force required to hold valve 30 in its operationally shut state need not be as great. Smaller, less powerful electromagnets, therefore, may be used. In turn, the overall size of the valve may be reduced.

It also will be appreciated as exemplified, again because of the difference in force generated against the shoulder versus the valve body face, seating pressure $P_S$ for valve 30 will be significantly lower than opening pressure $P_1$. For example, if opening pressure $P_1$ is set at 3,000 psi, valve 30 will not start to close again under the force generated by spring 72 alone until the pressure is approximately 600 psi. On the other hand, if valve 30 is assembled such that inlet 46 serves as the outlet and outlet 47 serves as the inlet, seating pressure $P_S$ will be substantially equal to opening pressure $P_1$.

It will be appreciated that the novel combination of various features in the pressure relief valves and valve systems of the subject invention retain important benefits of conventional pressure relief valves while providing significant advantages. Like conventional valves with automatically controlled actuators, the novel valves may be opened and shut. The novel valve systems also may be adjusted on the fly to accommodate different working or rated maximum pressures. For example, controller 81 may be reprogrammed with a new relief pressure $P_R$, and control system 80 will open valve 30 at the new relief pressure $P_R$. No changes in valve 30 are required. Like conventional designs, the novel valves also may be actuated in response to highly accurate pressure detectors. They will allow the system to be run safely at pressures approaching the specified relief pressure $P_R$. Unnecessary interruptions may be minimized, while at the same time minimizing the risk of having to scrap expensive flow iron because the valve did not open until the relief pressure $P_R$ was exceeded.

On the other hand, the novel valves and valve systems provide import advantages over valves with conventional, automatically controlled actuators. Though they can be controlled with precision and accuracy, conventional automatic actuators are relatively slow to open, that is, to place the valve is a fully open state in which flow through the valve is minimally restricted. In contrast, the novel valves can fully open near instantaneously after their electromagnet is de-energized. The pressure $P_1$ at which the mechanical force of spring 72 holds the valve shut may be set well below the relief pressure $P_R$ allowing the resistance of spring 72 to be easily and rapidly overcome.

Moreover, the novel pressure relief valves avoid problems inherent in conventional self-actuating pressure relief valves that rely on a resilient member, such as a spring-loaded or gas-charged valve stem. Spring and gas loaded valves are extremely difficult to calibrate. They also are affected by the temperature at which the valve operates. Unlike those conventional valves, the mechanical force provided by the resilient member in the novel valves is not required to hold the valve closed until pressures reach the relief pressure $P_R$ while at the same time allowing the valve to open at, not above the relief pressure $P_R$. Opening pressure $P_1$ may be set well below relief pressure $P_R$. Operation of the novel valves at pressure $P_1$ typically will not be nearly as critical as ensuring that the valve opens at, and not below or above the relief pressure $P_R$. Thus, the spring or other reliant member need not be tuned with the same effort and precision as for conventional pressure relief valves. An acceptable margin of error in the biasing force of the resilient member will be much greater.

Moreover, conventional check valves can tend to flutter or partially open at pressures approaching the relief pressure. Such effects can allow excessive pressure to persist in the system. In contrast, the novel pressure relief valves can more rapidly reduce pressure in the system. They not only open near instantaneously, but they remain fully open until pressure in the system has dropped significantly below the relief pressure $P_R$, that is, until pressure in the system approaches seating pressure $P_S$.

The terms "axial," "radial," and forms thereof as used herein reference primary axis X of preferred valve 30 along which valve stem 71 reciprocates unless otherwise specified. For example, axial movement or position refers to movements or positions generally along or parallel to the primary axis. "Radial" will refer to positions or movement toward or away from the primary axis.

In general, the novel pressure relief valves may be fabricated from materials and by methods typically used in pressure relief valves and in frac iron generally. Given the extreme stress and the corrosive and abrasive fluids to which they may be exposed, especially those designed for high-pressure flow lines, suitable materials will be hard and strong. For example, mainly excepting their seals, the components of novel pressure relief valves may be fabricated from 4130 and 4140 chromoly steel or from somewhat harder, stronger steel such as 4130M7, high end nickel alloys, and stainless steel. The plug and seats preferably will be fabricated from stainless steel or the other harder steels. The components may be made by any number of conventional techniques, but typically and in large part will be made by forging, extruding, or mold casting a blank part and then machining the required features into the part.

Seals suitable for use in the novel pressure relief valves are commercially available from many manufacturers. Suitable rotary pressure seals include, depending on the application, X-Pac® loaded U-cup seals (VT90 FKM (Viton) available from Martin Fluid Power Company, Inc. (MFP Seals) (www.mfpseals.com); urethane loaded lip seals available from Power Supply Components (powersupplyseals-.com), and H2155 Hytrel®/N6014 NBR polyseals available from MFP Seals. Suitable static pressure seals include Viton, HNBR, and Buna O-rings available from Parker Hannifin Corp. (www.parker.com). Workers in the art will be able to select an appropriate seal and design a corresponding gland in accordance with conventional design criteria.

Guide rings and seal backup rings also are commercially available from many manufacturers. They may be made of a hard material, such as steel, brass, and other metals, or from engineering plastics, such as polycarbonates, Nylon 6, Nylon 66, and other polyamides, including fiber reinforced polyamides such as Reny polyamide, polyether ether ketone (PEEK), and polyetherimides such as Ultem®.

Systems for controlling operation of the novel pressure relief valves may be assembled from conventional components. Suitable controllers, sensors, switches, and other control system components are well known and readily available from many commercial sources.

Finally, pressure relief valve 30 has been exemplified in the context of frac systems, such as frac system 24 shown in FIG. 1. It has been exemplified specifically as installed in flow line 14 that feeds fluid into zipper manifold 16. The novel pressure relief valves, however, may be used elsewhere, or in multiple locations in conventional frac systems, for example, in missile 13 of frac manifold 9. Although particularly designed for use on the high-pressure side of frac systems, they may find use in the low-pressure side as well. Likewise, the novel pressure relief valves may be used in other conventional fluid transportation systems, whether temporary or permanent, especially when abrasive or corrosive liquids will be transported at high pressure or high flow rates.

While this invention has been disclosed and discussed primarily in terms of specific embodiments thereof, it is not intended to be limited thereto. Other modifications and embodiments will be apparent to the worker in the art.

What is claimed is:

1. A pressure relief valve for A pressure relief valve for a high-pressure fluid transportation system, said pressure relief valve being normally shut and adapted to open at a relief fluid pressure corresponding to a maximum operating pressure of said system, said pressure relief valve comprising:
   (a) a valve fitting, said valve fitting comprising:
      i) a housing adapted for assembly into a high-pressure flow line, said housing having:
         (1) a fluid inlet adapted for fluid communication with said system;
         (2) a fluid outlet; and
         (3) a fluid flow path between said fluid inlet and said fluid outlet;
      ii) a valve seat in said fluid flow path;
      iii) a valve body adapted to selectively seat on said valve seat, said valve body exposed to fluid pressure in said fluid inlet;
   (b) a valve actuator coupled to said valve fitting; said valve actuator comprising:
      i) a bonnet coupled to said housing;
      ii) a valve stem; said valve stem being:
         (1) coupled to said valve body;
         (2) mounted in said bonnet for linear reciprocation between a closed position, in which said valve body is seated on said valve seat to shut off flow through said fluid flow path, and an open position, in which said valve body is unseated from said valve seat to allow flow through said fluid flow path;
      iii) a resilient element applying a mechanical force biasing said valve stem in its said closed position, said mechanical force allowing said valve stem to move to its open position and place said pressure relief valve in an open state at a first fluid pressure in said fluid inlet below said relief fluid pressure; and
      iv) an electromagnet applying, when energized, a magnetic force biasing said valve stem in its said closed position, said magnetic force, together with said mechanical force, being sufficient to hold said valve stem in its said closed position and said pressure relief valve in an operationally shut state at a second fluid pressure in said fluid inlet above said relief fluid pressure;
   (c) whereby during operation of said system:
      i) said valve stem is held in its said closed position and said pressure relief valve is in its operationally shut state at or below said second fluid pressure when said electromagnet is energized;
      ii) said valve stem is allowed to move to its open position and place said pressure relief valve in its open state at said relief fluid pressure by de-energizing said electromagnet; and
      iii) said valve stem is allowed to return to its closed position and place said pressure relief valve in its shut state after said electromagnet is de-energized when fluid pressure in said fluid inlet drops to a seating pressure at or below said first fluid pressure.

2. The pressure relief valve of claim 1, wherein:
   (a) said valve actuator comprises a ferromagnetic plate fixedly mounted on said valve stem;
   (b) said resilient element applies said mechanical force to said ferromagnetic plate to bias said valve stem in its closed position; and
   (c) said electromagnet, when energized, applies said electromagnet force to said ferromagnetic plate to bias said valve stem in its extended, closed position.

3. The pressure relief valve of claim 2, wherein said valve stem comprises an annular ferromagnetic plate mounted around said valve stem and extending radially therefrom.

4. The pressure relief valve of claim 3, wherein said electromagnet has a generally annular shape and is mounted around said valve stem of said valve actuator, said annular electromagnet and said annular plate having substantially equal diameters.

5. The pressure relief valve of claim 2, wherein a contact face of said ferromagnetic plate or said electromagnet is provided with a slight raised surface effective to create a narrow air gap between said contact faces.

6. The pressure relief valve of claim 1, wherein said electromagnet is a DC electromagnet.

7. The pressure relief valve of claim 1, wherein said resilient element is a spring and said pressure relief valve comprises:

(a) a first spring retainer slidably mounted around said valve stem between said electromagnet and a first end of said spring;

(b) a second spring retainer slidably mounted around said valve stem adjacent a second end of said spring; and (c) an adjusting nut bearing on said second retainer, said adjusting nut adapted to position said second retainer along said valve stem and thereby adjust said mechanical force of said spring.

8. The pressure relief valve of claim 1, wherein said valve seat is a cylindrical seat provided in a bore extending from either said fluid inlet or said fluid outlet and said valve body is a plug, said plug being adapted to extend into said cylindrical seat to shut off flow through said fluid flow path and to retract from said cylindrical seat to allow flow through said fluid flow path.

9. The pressure relief valve of claim 8, wherein said valve seat is a cylindrical sleeve insert carried within an enlarged diameter portion of said bore, said cylindrical sleeve insert having a pressure seal mounted in its inner circumference.

10. The pressure relief valve of claim 1, wherein said valve body is replaceably coupled to said valve stem.

11. The pressure relief valve of claim 1, wherein:

(a) said valve stem, in its said closed position, extends beyond said bonnet into said housing of said valve fitting; and (b) said valve actuator is provided with pressure seals between said valve stem and said bonnet to isolate said resilient element and said electromagnet from fluid in said fluid flow path.

12. The pressure relief valve of claim 1, wherein said pressure relief valve comprises:

(a) a first bore extending along a primary axis of said pressure relief valve; and (b) a second bore intersecting said first bore;

(c) wherein:

i) said valve seat is a cylindrical sleeve insert, wherein said cylindrical sleeve insert:

(1) is carried within an enlarged diameter portion of said first bore proximate to said intersection between said first bore and said second bore; and (2) has a pressure seal mounted in its inner circumference;

ii) said valve body is a plug mounted on a distal end of said valve stem;

iii) said valve stem, in its said closed position, extends across said intersection such that said plug extends into said cylindrical sleeve insert; and iv) said valve stem, in its said open position, retracts into said bonnet such that said plug is withdrawn from said cylindrical sleeve insert.

13. A pressure relief valve system for high-pressure fluid transportation systems, said pressure relief valve system comprising a pressure relief valve of claim 1 and a control system for detection of said relief fluid pressure and selectively energizing and de-energizing said electromagnet.

14. A pressure relief valve system for high-pressure fluid transportation systems, said pressure relief valve system comprising:

(a) the pressure relief valve of claim 1, and (b) a control system operatively connected to said pressure relief valve, said control system comprising:

i) a pressure sensor adapted to measure fluid pressure in said fluid transportation system;

ii) an electro-mechanical switch controlling current to said electromagnet; and iii) a controller adapted to receive signals from said sensor and to generate control signals to said switch to selectively energize said electromagnet;

(c) whereby:

i) said pressure relief valve is held in its operationally shut state at pressures below said relief fluid pressure by closing said switch and energizing said electromagnet; and ii) said pressure relief valve is opened by opening said switch and de-energizing said electromagnet in response to detection of said relief fluid pressure.

15. The pressure relief valve system of claim 14, wherein said electromagnet is powered by DC current.

16. The pressure relief valve system of claim 15, wherein said controller is adapted to reduce the level and reverse the polarity of power energizing said electromagnet before de-energizing said electromagnet.

17. The pressure relief valve system of claim 16, wherein a contact face of said ferromagnetic plate or said electromagnet is provided with a slight raised surface effective to create a narrow air gap between said contact faces.

18. A flow line for a high-pressure fluid transportation system, said flow line comprising the pressure relief valve system of claim 14.

19. A high-pressure fluid transportation system, said fluid transportation system comprising the flow line of claim 18.

20. The system of claim 19, wherein said fluid transportation system is a system for fracturing a well.

21. A method for controlling flow through a high-pressure fluid transportation system, wherein said method comprises:

(a) installing the pressure relief valve system of claim 14 in fluid communication with a fluid conduit in said fluid transportation system;

(b) opening said pressure relief valve upon detection of the relief fluid pressure, thereby relieving excess pressure in said conduit.

22. The method of claim 21, the method comprising:

(a) energizing said electromagnet when pressure in said fluid inlet is below said first fluid pressure to place said pressure relief valve in its operationally shut state;

(b) flowing fluids through said conduit at high pressures; and (c) de-energizing said electromagnet if said fluid pressure in said conduit is equal to or greater than said relief fluid pressure.

23. The method of claim 22, wherein said electromagnet is energized with DC power and said method comprises reducing the level of said DC power and reversing its polarity immediately prior to de-energizing said electromagnet.

24. The pressure relief valve of claim 1, wherein said resilient member is a coil spring.

25. The pressure relief valve of claim 8, wherein said valve seat is a replaceable valve seat insert mounted in said bore.

26. The pressure relief valve of claim 12, wherein said first bore and said second bore are normal to each other.

27. The pressure relief valve of claim 12, wherein:

(a) said valve stem is mounted for linear reciprocation in a passage in said bonnet; and (b) said passage in said bonnet is aligned axially with said first bore.

28. The pressure relief valve of claim 12, wherein a replaceable wear sleeve is mounted in said intersection of said first bore and said second bore.

29. A flow line for a high-pressure fluid transportation system, said flow line comprising the pressure relief valve of claim 1.

30. A high-pressure fluid transportation system, said system comprising the flow line of claim 1.

31. The system of claim 30, wherein said system is a system for fracturing a well.

32. A pressure relief valve system for high-pressure fluid transportation systems, said pressure relief valve system comprising:

(a) the pressure relief valve of claim 12, and (b) a control system operatively connected to said pressure relief valve, said control system comprising:

i) a pressure sensor adapted to measure fluid pressure in said fluid transportation system;

ii) an electro-mechanical switch controlling current to said electromagnet; and iii) a controller adapted to receive signals from said sensor and to generate control signals to said switch to selectively energize said electromagnet;

(c) whereby:

i) said pressure relief valve is held in its operationally shut state at pressures below said relief fluid pressure by closing said switch and energizing said electromagnet; and ii) said pressure relief valve is opened by opening said switch and de-energizing said electromagnet in response to detection of said relief fluid pressure.

33. The pressure relief valve system of claim 32, wherein said electromagnet is powered by DC current.

34. The pressure relief valve system of claim 33, wherein said controller is adapted to reduce the level and reverse the polarity of power energizing said electromagnet before de-energizing said electromagnet.

35. The pressure relief valve system of claim 34, wherein a contact face of said ferromagnetic plate or said electromagnet is provided with a slight raised surface effective to create a narrow air gap between said contact faces.

36. A flow line for a high-pressure fluid transportation system, said flow line comprising the pressure relief valve system of claim 32.

37. A high-pressure fluid transportation system, said fluid transportation system comprising the flow line of claim 36.

38. The system of claim 37, wherein said fluid transportation system is a system for fracturing a well.

39. A method for controlling flow through a high-pressure fluid transportation system, wherein said method comprises:

(a) installing the pressure relief valve system of claim 32 in fluid communication with a fluid conduit in said fluid transportation system;

(b) opening said pressure relief valve upon detection of the relief fluid pressure, thereby relieving excess pressure in said conduit.

40. The method of claim 39, the method comprising:

(a) energizing said electromagnet when pressure in said fluid inlet is below said first fluid pressure to place said pressure relief valve in its operationally shut state;

(b) flowing fluids through said conduit at high pressures; and (c) de-energizing said electromagnet if said fluid pressure in said conduit is equal to or greater than said relief fluid pressure.

41. The method of claim 40, wherein said electromagnet is energized with DC power and said method comprises reducing the level of said DC power and reversing its polarity immediately prior to de-energizing said electromagnet.

\* \* \* \* \*